US008762838B2

(12) United States Patent
Kojima

(10) Patent No.: US 8,762,838 B2
(45) Date of Patent: Jun. 24, 2014

(54) IMAGE DISPLAY CONTROLLING DEVICE, IMAGING DEVICE, AND IMAGE DISPLAY METHOD

(75) Inventor: Takayoshi Kojima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1229 days.

(21) Appl. No.: 11/904,826

(22) Filed: Sep. 28, 2007

(65) Prior Publication Data

US 2008/0082919 A1 Apr. 3, 2008

(30) Foreign Application Priority Data

Sep. 28, 2006 (JP) ................................. 2006-264473
Jul. 17, 2007 (JP) ................................. 2007-185815

(51) Int. Cl.
| H04N 5/907 | (2006.01) |
| G11B 27/34 | (2006.01) |
| G06F 17/30 | (2006.01) |
| H04N 5/77 | (2006.01) |
| H04N 21/00 | (2011.01) |
| H04N 101/00 | (2006.01) |

(52) U.S. Cl.
CPC .............. *H04N 5/907* (2013.01); *H04N 5/772* (2013.01); *G11B 27/34* (2013.01); *G06F 17/30274* (2013.01); *H04N 2101/00* (2013.01)
USPC ...... 715/700; 715/716; 348/231.8; 348/231.2

(58) Field of Classification Search
CPC ....... H04N 5/907; H04N 5/772; G11B 27/34; B06F 17/30274
USPC .................... 715/700, 716; 348/231.88, 231.2
See application file for complete search history.

(56) References Cited

U.S. PATENT DOCUMENTS 6,538,698 B1 * 3/2003 Anderson ................ 348/333.05
6,608,650 B1 * 8/2003 Torres et al. ............. 348/333.02

(Continued)

FOREIGN PATENT DOCUMENTS

JP 2002-281367 9/2002
JP 2004-104601 A 4/2004

(Continued)

OTHER PUBLICATIONS

English Language Abstract of Machine Translation of Japanese Publication No. JP2005-033468 A (7 pages).

(Continued)

*Primary Examiner* — Jordany Nunez
(74) *Attorney, Agent, or Firm* — Nutter McClennen & Fish LLP; John J. Penny, V.

(57) ABSTRACT

A digital camera checks whether an image file stored in a flash memory unit belongs to an image file group including a RAW file and a JPEG file generated from the RAW file, and displays an image of an image file belonging to the image file group and an image of a single image file not belonging to any image file group in mutually different modes and so that the user can select an image. If the image of the image file group is selected, text that allows the user to select an image file to be deleted among the image files belonging to the image file group is displayed. As described above, one image corresponding to an image file among a plurality of image files belonging to an image file group is displayed, and text that allows the user to select an image file to be deleted is displayed.

15 Claims, 8 Drawing Sheets

(56) References Cited

U.S. PATENT DOCUMENTS

| | | | |
|---|---|---|---|
| 7,106,375 B2* | 9/2006 | Venturino et al. | 348/333.02 |
| 7,193,646 B1 | 3/2007 | Shioji | |
| 7,589,767 B2* | 9/2009 | Ishibashi et al. | 348/231.8 |
| 2001/0023436 A1* | 9/2001 | Srinivasan et al. | 709/219 |
| 2003/0011687 A1 | 1/2003 | Imura et al. | |
| 2003/0112357 A1 | 6/2003 | Anderson | |
| 2003/0169349 A1 | 9/2003 | Aoi et al. | |
| 2003/0189652 A1 | 10/2003 | Takayama | |
| 2003/0229894 A1* | 12/2003 | Okada et al. | 725/41 |
| 2004/0264810 A1 | 12/2004 | Taugher et al. | |
| 2005/0097475 A1* | 5/2005 | Makioka et al. | 715/792 |
| 2005/0105806 A1 | 5/2005 | Nagaoka et al. | |
| 2006/0268126 A1 | 11/2006 | Ishibashi et al. | |
| 2009/0037605 A1* | 2/2009 | Li | 709/246 |

FOREIGN PATENT DOCUMENTS

| | | |
|---|---|---|
| JP | 2004-247873 | 9/2004 |
| JP | 2005-033468 A | 2/2005 |
| JP | 2005-176272 A | 6/2005 |
| JP | 2005354527 A | 12/2005 |
| JP | 2006042004 A | 2/2006 |
| JP | 2007189428 A | 7/2007 |
| KR | 2006-125543 | 12/2006 |

OTHER PUBLICATIONS

English Language Abstract of Machine Translation of Japanese Publication No. JP2004-104601 A. (14 pages).

English Language Abstract of Machine Translation of Japanese Publication No. JP2005-176272 A. (11 pages).

Office Action dated Aug. 11, 2010, U.S. Appl. No. 11/904,964.

Office Action dated Oct. 5, 2009, U.S. Appl. No. 11/904,964.

Office Action dated Feb. 4, 2011 U.S. Appl. No. 11/904,694.

Notice of Allowance dated Jun. 1, 2011, U.S. Appl. No. 11/904,694.

Notice of Allowance dated Sep. 2, 2011 for U.S. Appl. No. 11/904,694.

* cited by examiner (a)

(b)

IMAGE DISPLAY CONTROLLING DEVICE, IMAGING DEVICE, AND IMAGE DISPLAY METHOD

BACKGROUND OF THE INVENTION

1. Field of the Invention

The present invention relates to image display controlling devices, imaging devices, and image display methods.

2. Description of the Related Art

In a type of proposed imaging device, a lossless-compressed RAW file and a JPEG file generated from the RAW file and lossy-compressed are stored in a memory and these files are displayed (e.g., Japanese Unexamined Patent Application Publication No. 2005-33468).

SUMMARY OF THE INVENTION

In the imaging device described in Japanese Unexamined Patent Application Publication No. 2005-33468, for example, a RAW file and a JPEG file generated from the RAW file are handled as a set of image files, and only an image of either the RAW file or the JPEG file is displayed on a screen for selecting an image file. In this case, for example, when a user selects an image displayed, even if the user wishes to select the RAW file or the JPEG file individually, in some cases, the user is allowed only to select the RAW file and the JPEG file together. On the other hand, for example, in the case of an image file viewer device that displays image files stored in a memory, a RAW file and a JPEG file generated from the RAW file are handled as separate images, so that in sane cases, too many corresponding images are displayed on a screen for selecting an image file. In this case, although it is possible to select image files individually, since the number of images displayed is large, in some cases, it is difficult for the user to find a desired image file. Furthermore, in some cases, the user wishes to obtain an image of a desired quality (image tone) using a RAW file.

The present invention has been made in view of the problems described above, and it is an object thereof to provide an image display controlling device, an imaging device, an image display method, and a program of the image display method with which the user can select individual image files belonging to an image file group including two or more image files and with which the user can readily select a desired file.

In order to achieve the object described above, the present invention employs the following scheme.

The present invention provide an image display controlling device including a display unit capable of displaying an image; an acquisition module that acquires an image file from a storage module; a determination module that determines whether the acquired image file belongs to an image file group including two or more image files, each of the two or more image files being an original image file or a generated image file generated from the original image file; and a control module that displays on the display unit an image corresponding to one of the image files belonging to the image file group when it is determined by the determination module that the acquired image file belongs to the image file group, in such a manner that a user is allowed to select the image, and that displays on the display unit information that allows the user to select an image file on which predefined processing is to be executed among the image files belonging to the image file group, the information being represented by text, graphics, or symbols.

In the image display controlling device, it is checked whether a stored image file belongs to an image file group including two or more image files including at least one of an original image file and a generated image file generated from the original image file. If it is determined that the stored image file belongs to the image file group, an image corresponding to one of the image files belonging to the image file group is displayed in such a manner that a user is allowed to select the image, and information that allows the user to select an image file on which predefined processing is to be executed among the image files belonging to the image file group is displayed, the information being represented by text, graphics, or symbols. As described above, since only one image is displayed among a plurality of images, the user can readily select a desired file. Furthermore, since information that allows the user to select an image file on which predefined processing is to be executed is displayed in text, graphics, or symbols, the user can select individual image files belonging to an image file group including two or more image files.

In the image display controlling device of the invention, the determination module may determine whether the acquired image file belongs to an image file group including a RAW file and a JPEG file, the RAW file being a pre-development, uncompressed or lossless-compressed file that serves as the original image file, and the JPEG file being a post-development lossy-compressed file that serves as the generated image file. The storage module may store an image file group including a RAW file and a JPEG file, the RAW file being a pre-development, uncompressed or lossless-compressed file that serves as the original image file, and the JPEG file being a post-development lossy-compressed file that serves as the generated image file.

In the image display controlling device of the invention, in displaying information that allows the user to select an image file on which predefined processing is to be executed among the image files belonging to the image file group, the information being represented by text, graphics, or symbols, the control module may display on the display unit text, graphics, or symbols representing the predefined processing defined so that either the original image file or the generated image file is selected upon selection of the predefined processing.

In the image display controlling device of the invention, after displaying on the display unit an image corresponding to one of the image files belonging to the image file group in such a manner that the user is allowed to select the image, when an image of the image file group has been selected and the information has been displayed, the information being represented by text, graphics, or symbols, and allowing the user to select an image file on which predefined processing is to be executed among the image files belonging to the image file group, the control module may display on the display unit an image of the original image file and an image of the generated image file in such a manner that the user is allowed to compare these images.

The image display controlling device may further include a selection module that allows the user to select an image displayed on the display unit, and the control module may display on the display unit an image of an image file determined by the determination module as belonging to the image file group and an image of a single image file determined by the determination module as not belonging to the image file group, in such a manner that the user is allowed to select either one of these images, and display on the display unit information that allows the user to select an image file on which predefined processing is to be executed among the image files belonging to the image file group when the image of the image file belonging to the image file group has been selected by the selection module, the information being represented by text, graphics, or symbols. In this case, the control module may display an image of the image file belonging to the image file group and an image of the single image file not belonging to the image file group in different manners.

The image display controlling device may further include an instruction acquisition module that acquires from the user an instruction for starting selection of an image file on which the predefined processing is to be executed, and the determination module may check whether the image file stored in the storage module belongs to the image file group after the instruction acquisition module has obtained the instruction for starting selection of an image file.

The image display controlling device may further include: a condition input module that allows input of a condition used to generate a generated image file from the original image file according to an operation by the user; and a generation execution module that generates the generated image file from the original image file according to the condition input, and the control module may cause the generation execution module to generate the generated image file from the original image file according to the condition input when generation of a generated image file is selected as the predefined processing.

In the image display controlling device of the invention, the control module may display information that allows the user to select one of deletion of an image file, copying of an image file, moving of an image file, and printing of an image file, and generation of a generated image file as the predefined processing.

In the image display controlling device of the invention, the control module may display on the display unit an image corresponding to one of the image files belonging to the image file group when the number of images displayed on the display unit exceeds a predetermined permissible number, in such a manner that the user is allowed to select the image, and displays on the display unit information that allows the user to select an image file on which predefined processing is to be executed among the image files belonging to the image file group, the information being represented by text, graphics, or symbols. In the image display controlling device of the invention, the control module may include a buffer module that temporarily stores information of the image file stored in the storage module, and the control module may display on the display unit an image corresponding to one of the image files belonging to the image file group when the amount of information stored in the buffer module exceeds a predetermined permissible storage amount, in such a manner that the user is allowed to select the image, and displays on the display unit information that allows the user to select an image file on which predefined processing is to be executed among the image files belonging to the image file group, the information being represented by text, graphics, or symbols.

The present invention also provides an imaging device including: an imaging module capable of capturing an image of an object; an image-file creating module that creates an image file from information of the image captured by the imaging module and that stores the image file in a storage module; and the image display controlling device of the invention described above.

The present invention also provides an image display method using a display unit capable of displaying an image and a storage module capable of storing an image file, including the steps of: (a) determining whether the image file stored in the storage module belongs to an image file group including two or more image files, each of the two or more image files being an original image file or a generated image file generated from the original image file; and (b) displaying on the display unit an image corresponding to one of the image files belonging to the image file group when it is determined by the step (a) that the stored image file belongs to the image file group, in such a manner that a user is allowed to select the image, and displaying on the display unit information that allows the user to select an image file on which predefined processing is to be executed among the image files belonging to the image file group, the information being represented by text, graphics, or symbols. In this image display method, any application described above in connection with the image controlling display device of the invention may be employed, and any additional step may be added to achieve respective functions of the image display controlling device of the invention described above.

The present invention is also actualized as a program that causes one or multiple computers to execute the respective steps of the image display method of the invention described above. The program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. By causing a single computer execute all the procedures or multiple computers share execution of the procedures, the respective steps of the image display method are executed so as to achieve the same effects as those by the image display method.

DESCRIPTION OF THE PREFERRED EMBODIMENTS

Figure 1:
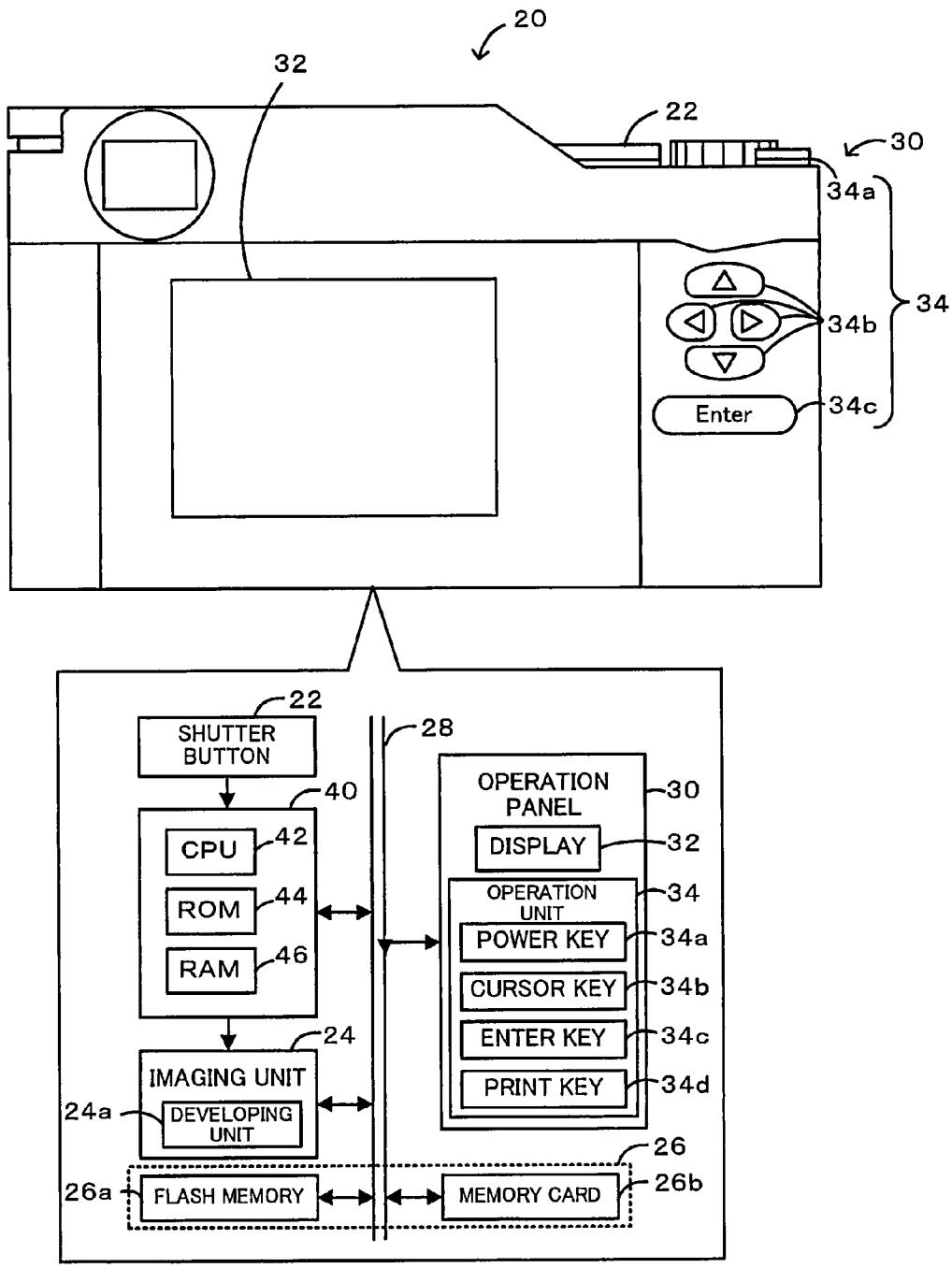
FIG. 1 is a diagram schematically showing the configuration of a digital camera according to an embodiment of the present invention.
Figure 2:
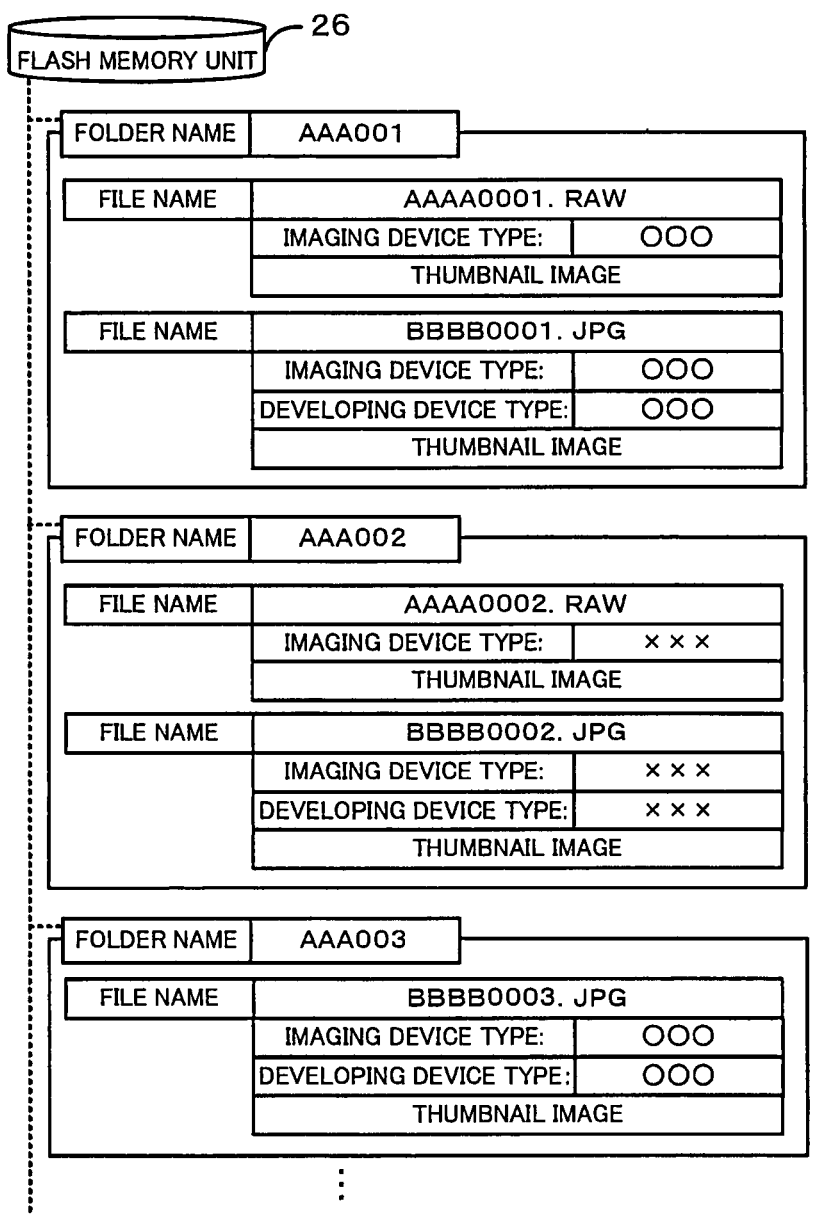
FIG. 2 is a diagram showing information stored in a flash memory unit.

Next, embodiments of the present invention will be described with reference to the drawings. FIG. 1 is a diagram schematically showing the configuration of a digital camera 20 according to an embodiment of the present invention. FIG. 2 is a diagram showing information stored in a flash memory unit 26. The digital camera 20 includes an imaging unit 24, a flash memory unit 26, an operation panel 30, and a controller 40. The imaging unit 24 captures an image of an object in response to pressing of a shutter button 22 and creates an image file on the basis of captured image information. The flash memory unit 26 is a non-volatile storage medium for storing the image file created by the imaging unit 24. The operation panel 30 can display various types of information and allows a user to input various instructions. The controller 40 controls the overall operation of the digital camera 20. The controller 40 is electrically connected to the imaging unit 24, the flash memory unit 26, and the operation panel 30 via a bus 28.

In the imaging unit 24, a shutter (not shown) is driven in response to pressing of the shutter button 22 so that light reflected by an object is input through a lens. The input light undergoes photoelectric conversion by an imaging element such as a charge coupled device (CCD), and a developing unit 24*a* creates an image file on the basis of electric signals obtained through the photoelectric conversion. The imaging unit 24 can be implemented by a unit having a known configuration. In this embodiment, the imaging unit 24 is configured so that the imaging unit 24 can generate a RAW file on the basis of the electric signals, the RAW file being a non-compressed or lossless-compressed image file before development, and so that the imaging unit 24 can generate a JPEG file on the basis of the electric signals, the JPEG file being a lossy-compressed image file after development, obtained by executing known image processing (e.g., white balancing or gamma correction) on the RAW file by the developing unit 24*a*. When capturing an image with the digital camera 20, the user can select either an original-image storing mode or a storage saving mode. In the original-image storing mode, a RAW file and a JPEG file generated from the RAW file are both stored. In the storage saving mode, only the JPEG file is stored. Although a JPEG file is generated from a RAW file in this embodiment, alternatively, a JPEG file and a RAW file may be generated directly from electric signals obtained by the imaging element.

The flash memory unit 26 includes a non-volatile flash memory 26*a* fixed to a main unit of the digital camera 20, and a portable memory card 26*b* that can be attached to or detached from the main unit of the digital camera 20. As shown in FIG. 2, the flash memory unit 26 stores image files representing images captured by the imaging unit 24. Each JPEG file is assigned a file name including a four-digit number immediately succeeding a number included in the file name of the last created image file. Each RAW file is assigned a file name including a four-digit number that is the same as a number included in the file name of a corresponding JPEG file generated. These image files are sequentially stored in a folder having a folder name including a three-digit number immediately succeeding a number included in the folder name of the last created folder. Furthermore, in each RAW file, information regarding a device used for imaging (e.g., a manufacturer name, a device name, etc.) is stored. Furthermore, depending on the type of the device used for imaging, thumbnail images developed by the imaging device are stored. In each JPEG file, information regarding a device used for imaging, information regarding a device used for developing, thumbnail images, and so forth are stored. In this embodiment, when a RAW file before development and a JPEG file obtained by developing the RAW file are stored, the RAW file and the JPEG file are referred to as "image files belonging to an image file group". When only either a RAW file or a JPEG file is stored, the image file is referred to as a "single image file". Furthermore, in the digital camera 20, a RAW file and a JPEG file generated from the RAW file are stored in the same folder. When only either a RAW file or a JPEG file is stored, the file is stored alone in one folder. As described above, regarding an image captured or developed by the digital camera 20, it is possible to recognize whether an image file belongs to an image file group on the basis of the numbers in the folder name and the file name. In this embodiment, the flash memory unit 26 also stores image files of images captured or developed by other imaging devices. The flash memory unit 26 may be alternatively composed of only either one of the flash memory 26*a* fixed to the main unit and the portable memory card 26*b*.

The operation panel 30 is a device that allows the user to input various instructions to the digital camera 20. The operation panel 30 has a display 32 that displays text, graphics or symbols, and images according to various instructions, and an operation unit 34 for executing various operations. The display 32 is implemented by a liquid crystal panel that displays color images. The operation unit 34 includes a power key 34*a* that is pressed when activating or deactivating the digital camera 20, a cursor key 34*b* that is pressed when the user moves a cursor or the like for selecting processing, text, or the like, an enter key 34*c* that is pressed when the user fixes selection of processing or the like, and a print key 34*d* that is pressed to instruct that an image be printed by a printing device (not shown) connected to the digital camera 20 via a cable. Furthermore, although not shown, the operation unit 34 includes a back key that is pressed when canceling selected processing or the like, a display switching key that is pressed when switching screens, a menu key that is pressed when displaying a menu screen for various settings, and so forth.

The controller 40 is implemented as a microprocessor including a central processing unit (CPU) 42 as a main component. In addition to the CPU 42, the controller 40 includes a read-only memory (ROM) 44 for storing processing programs, a random access memory (RAM) 46 for temporarily storing data, and an input/output port and a communication port (not shown). The controller 40 receives input of pressing signals from the shutter button 22, various signals from the imaging unit 24, various types of data read from the flash memory unit 26, input signals from the operation unit 34 of the operation panel 30, and so forth. Furthermore, the controller 40 outputs driving signals to the imaging unit 24, development instructions to the developing unit 24*a*, request signals for various types of data to the flash memory unit 26, display signals to the display 32 of the operation panel 30, and so forth.

First Embodiment

Figure 3:
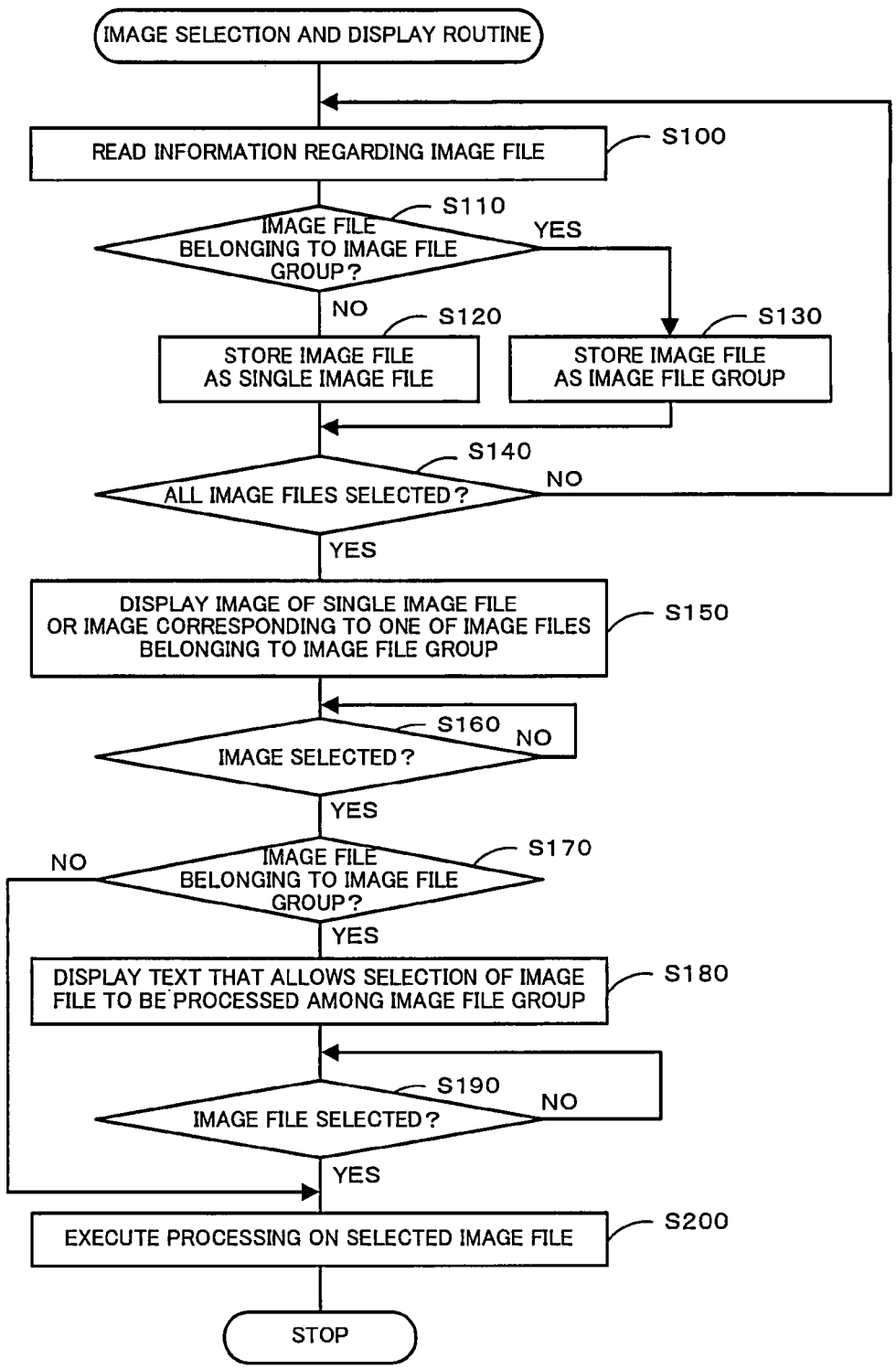
FIG. 3 is a flowchart showing an example of an image selection and display routine.

Next, an operation of the digital camera 20 according to a first embodiment will be described. Particularly, an operation for displaying an image stored in the flash memory unit 26 and executing predetermined processing, deletion in this example, will be described. FIG. 3 is a flowchart showing an example of an image selection and display routine executed by the CPU 42 of the controller 40. This routine is stored in the ROM 44, and is executed when "Delete image file" in a menu screen (not shown) is selected by a user's operation of the operation unit 34. Upon the start of the routine, the CPU 42 first reads information (a file name or the like) of an image file stored in the flash memory unit 26 (step S100), and checks whether the image file belongs to an image file group (step S110). Whether the image file belongs to an image file group can be determined on the basis of whether a JPEG file and a RAW file are included in the same folder, or whether a JPEG file and a RAW file have file names including the same number. If the image file does not belong to any image file group, the CPU 42 stores the image file in the RAM 46 as a single image file (step S120). If the image file belongs to an image file group, the CPU 42 stores the image file in the RAM 46 as one of the files belonging to the image file group, i.e., as either a RAW file or a JPEG file generated from the RAW file (step S130). Then, the CPU 42 checks whether all the image files have been read from the flash memory unit 26 (step S140). If all the image files have not been read, step S100 and the subsequent steps are repeated. If all the image files have been read, the CPU 42 displays on the display 32 an image selection screen 80 that allows selection of an image by the user (step S150). In the image selection screen 80, for each single-image file, an image corresponding to the single image file is displayed, and for each image file group, an image corresponding to one of the image files included in the image file group is displayed.

Figure 4:
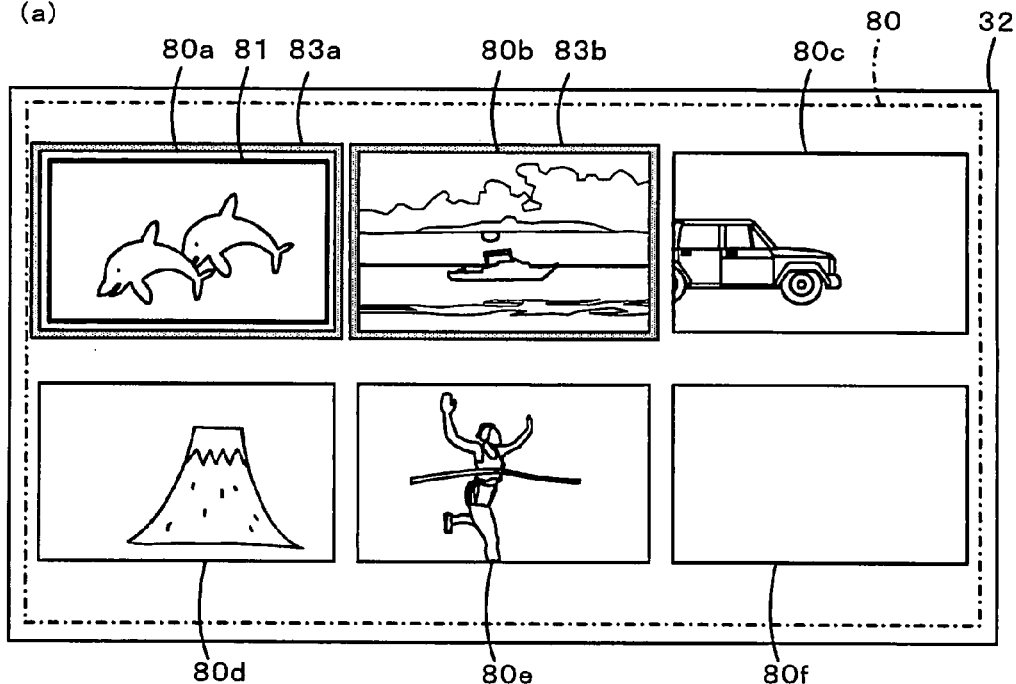
FIG. 4 is an illustration of an image selection screen displayed on a display, in which part (a) shows a state before image selection and part (b) shows a state after image selection.
Figure 4:
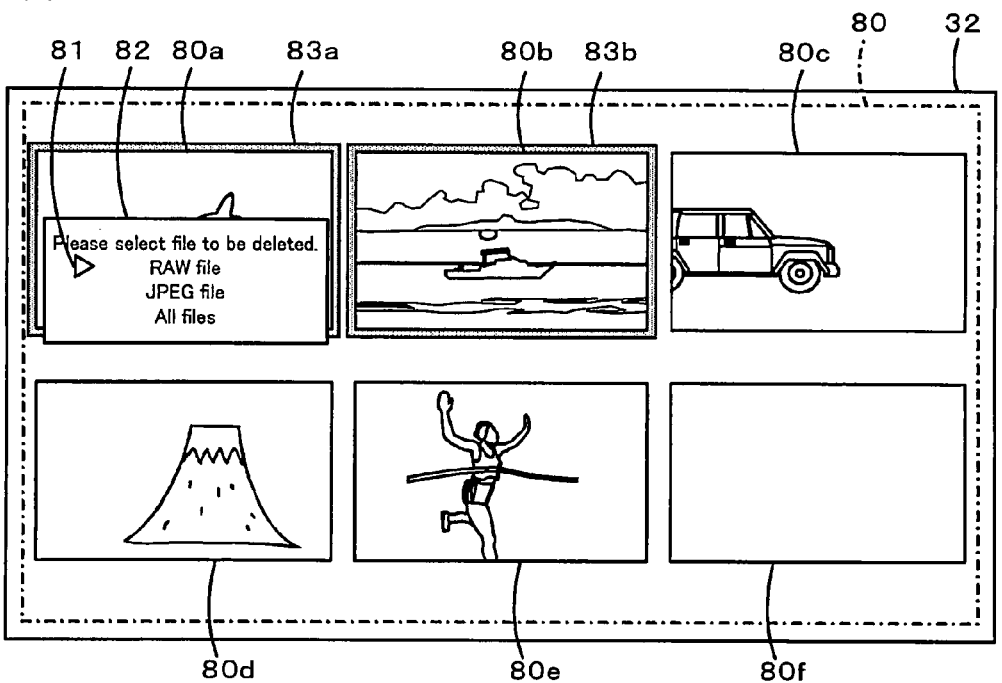

FIG. 4 is an illustration showing the image selection screen 80 displayed on the display 32. In FIG. 4, part (a) shows a state before image selection, and part (b) shows a state after image selection. In the image selection screen 80, images 80a to 80f that serve as thumbnail images of individual image files are arranged in three columns and two rows, and a cursor 81 is moved according to pressing of the right or left key of the cursor key 34b so that a next page or a previous page of images is displayed. Furthermore, in the image selection screen 80, an image of an image file group is displayed in a mode different from a mode of display of an image of a single image file. In this example, the image 80a is displayed with a surrounding frame 83a, and the image 80b is displayed with a surrounding frame 83b. As an image of an image file group, a thumbnail image based on a JPEG file is used as the first choice, a thumbnail image based on a RAW file is used as the next choice, and when neither of these thumbnail images is available, a thumbnail image is created from a JPEG file or a RAW file and the thumbnail image is displayed. When creating a thumbnail image from a RAW file, the RAW file is developed in the developing unit 24a. If the development in the developing unit 24a does not succeed, no corresponding thumbnail image is displayed in the image selection screen 80.

After step S150, the CPU 42 checks on the basis of pressing of the enter key 34c whether an image displayed in the image selection screen 80 has been selected (step S160). If no image has been selected, the CPU 42 keeps waiting. If an image has been selected, the CPU 42 checks whether the selected image is an image belonging to an image file group (step S170). If the selected image is an image belonging to an image file group, the CPU 42 displays on the display 32 a selection menu showing text asking the user to select an image file that is to be deleted among the image file group (step S180), as shown in part (b) of FIG. 4. The selection menu 82 is a pull-down menu that allows selection of deletion of a RAW file, deletion of a JPEG file, or deletion of all files.

Then, the CPU 42 checks on the basis of pressing of the enter key 34c whether an image file has been selected by selecting one of the options in the selection menu 82 (step S190). If no image file has been selected, the CPU 42 keeps waiting. On the other hand, if an image file has been selected, or if it is determined in step S170 that the selected image is an image not belonging to any image file group, i.e., when the selected image is an image of a single image file, the selected image file is deleted (step S200). The CPU 42 then exits the routine. In step S200, a RAW file is deleted when "RAW file" is selected, a JPEG file is deleted when "JPEG file" is selected, and both a RAW file and a JPEG file are deleted when "All files" is selected.

Now, the corresponding relationship between the elements in this embodiment and elements in the present invention will be described. The display 32 in this embodiment corresponds to a display unit in the present invention, the flash memory unit 26 corresponds to a storage module, the operation unit 34 corresponds to a selection module, the imaging unit 24 corresponds to an imaging module and an image-file creating module, and the CPU 42 corresponds to a determination module, an instruction acquisition module, and a control module. This embodiment also demonstrates an example of an image display method according to the present invention through description of the operation of the digital camera 20.

With the digital camera 20 according to this embodiment described above in detail, it is checked whether an image file stored in the flash memory unit 26 belongs to an image file group including a RAW file and a JPEG file generated from the RAW file. Then, the image selection screen 80 that allows selection of an image corresponding to an image file belonging to an image file group or a single image file not belonging to any image file group is displayed on the display 32. If an image of an image file group is selected by an operation of the operation unit 34, the selection menu 82, showing text that allows the user to select which of the image files belonging to the image file group is to be deleted, is displayed on the display 32. As described above, only one image among a plurality of images belonging to an image file group is displayed, and the user can readily select a desired file. Furthermore, since text that allows the user to select which image file is to be deleted is displayed, the user can select individual image files belonging to an image file group. Furthermore, application of the present invention to RAW files and JPEG files is effective since JPEG files are often generated by compressing RAW files. Furthermore, since the selection menu 82 is displayed when the user has selected an image in the image selection screen 80, the user can readily select an image belonging to an image file group or an image of a single image file. Furthermore, since an image of an image file group and an image of a single image file are displayed in mutually different modes, the user can readily recognize visually whether a displayed image corresponds to a single image file or to a group of two or more image files.

Furthermore, since whether an image file belongs to an image file group is checked after receiving an instruction for starting selection of an image file to be deleted according to a user's operation of the display 34, images corresponding to image files for selection can be displayed at a timing desired by the user. Furthermore, application of the present invention to deletion of an image file is effective since deletion of an image file is often executed after displaying images and selecting one of the images. Furthermore, since it suffices to display only one image for an image file group, it is possible to save use of the resource of the RAM 46, so that processing can be executed smoothly.

Second Embodiment

Figure 5:
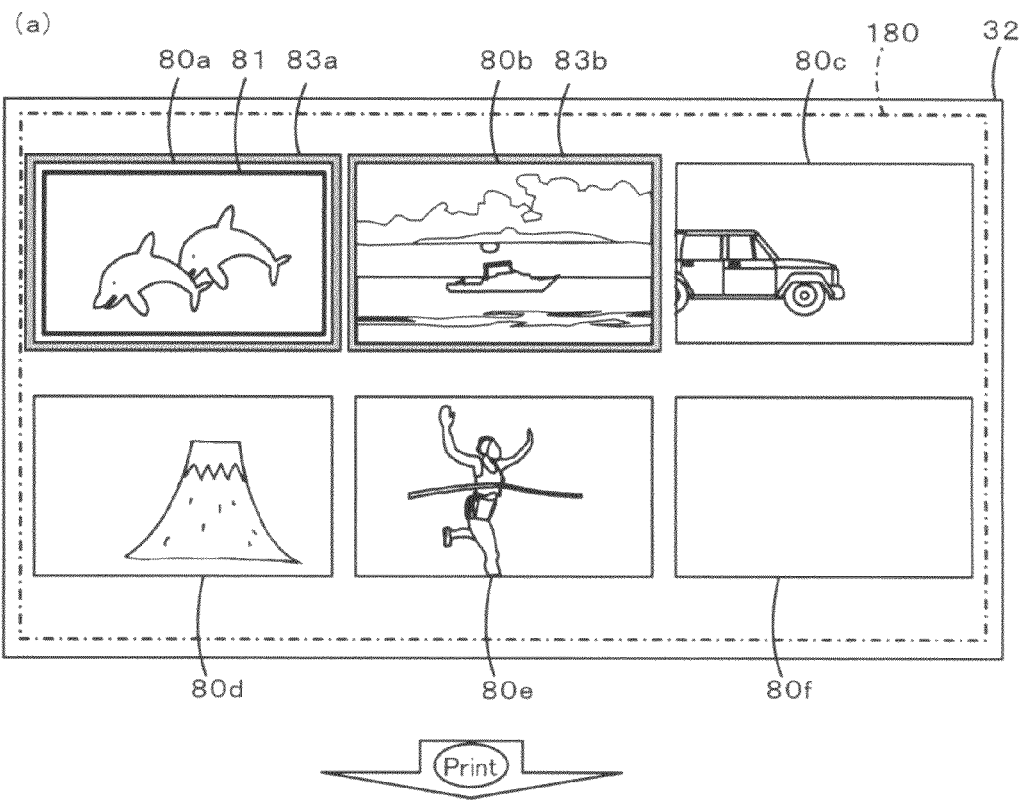
FIG. 5 is an illustration of another image selection screen, in which part (a) shows a state before image selection and part (b) shows a state after image selection.
Figure 5:
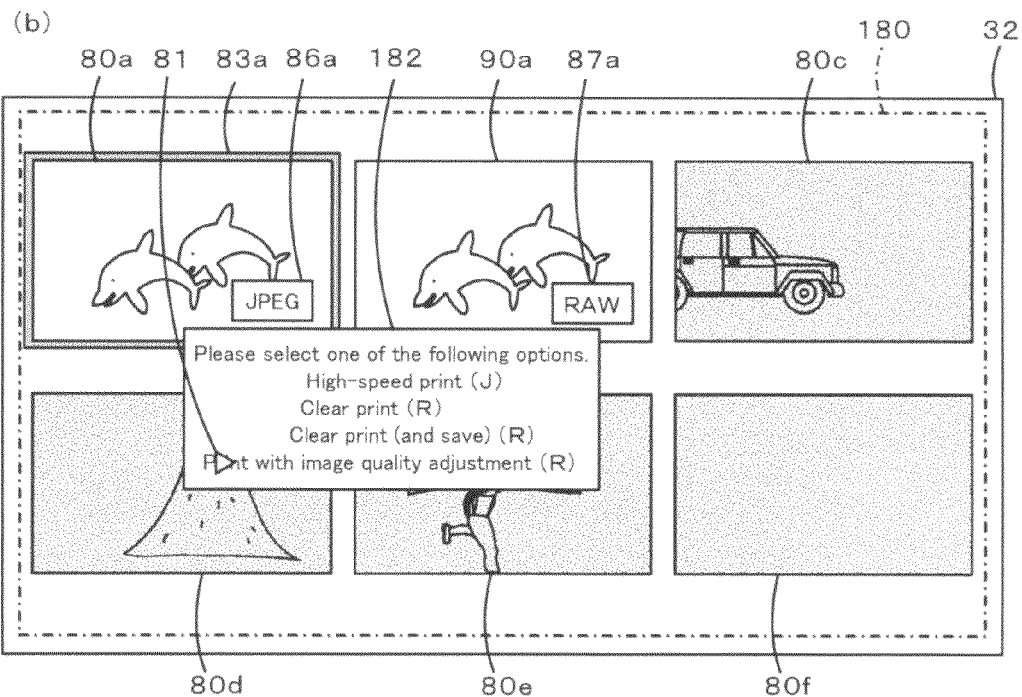

Next, a second embodiment of the present invention will be described with reference to the drawings. In the second embodiment, the digital camera 20 is configured the same as in the first embodiment, so that the corresponding components are designated by the same numerals, and description thereof will be omitted. In the first embodiment described above, upon selection of an image file group, the selection menu 82 is displayed on the display 32 while maintaining the display of the image selection screen 80. In contrast, according to the second embodiment, when a selection menu 182 is displayed, an image selection screen 180 is displayed on the display 32, in which the image 80a based on a JPEG file and an image 90b based on a corresponding RAW file are shown so as to allow comparison, as shown in part (b) of FIG. 5. FIG. 5 is an illustration of the image selection screen 180 displayed on the display 32, in which part (a) shows a state before image selection and part (b) shows a state after image selection. In this embodiment, when the print key 34d is pressed so that printing will be executed as predefined processing while the cursor 81 is on the image 80 in the image selection screen 80 (refer to part (a) of FIG. 4) described earlier, the image 80a being an image belonging to an image file group, the image selection screen 180 is displayed on the display 32, in which the image 80a based on a JPEG file and the image 90b based on a corresponding RAW file are arranged side by side (refer to part (b) of FIG. 5). In this embodiment, a thumbnail image generated by developing the RAW file by the developing unit 24a is displayed at a predetermined position on the display 32. However, since the development takes certain time, alternatively, it is possible to first display a thumbnail image stored in the RAW file and to replace the thumbnail image with a developed thumbnail image upon completion of the development. As described above, after displaying images of individual image file groups and images of individual single image files in the image selection screen 180, when an image of an image file group has been selected and the selection menu 182 is displayed, the image 80a based on a JPEG file and the image 90a based on the corresponding RAW file are arranged side by side. Considering that the image equality (image tone) of an image file varies depending on developing conditions of a device used for development, the user can check the image quality of the JPEG file and the image quality of the RAW file on the image selection screen 180 to determine which of these image files should undergo subsequent processing (e.g., printing or deletion).

Furthermore, in the image selection screen 180, the selection menu 182 is displayed in the proximity of the selected image (below the image 80a in this example), the display menu 182 showing text representing options of predefined processing, each of the options being defined so that either the RAW file or the JPEG file is selected upon selection of the option. The selection menu 182 includes an option "High-speed print (J)" for printing the JPEG file, an option "Clear print (R) for developing the RAW file according to default developing conditions of the digital camera 20 and printing the developed JPEG file, an option "Clear print (and save) (R)" for executing "Clear printing" and saving the developed JPEG file in the flash memory unit 26, and an option "Print with image quality adjustment (R)" for developing the RAW file according to user-defined developing conditions and printing the developed JPEG file. These options are arrayed vertically. Upon selection of one of these options, in the case of an option with (R), the RAW file is developed by the developing unit 24a and subsequent processing is then executed. In the case of an option with (J), subsequent processing is executed using the JPEG file. As described above, individual options of processing are associated in advance with image files, so that upon selection of an option, the corresponding processing is executed without explicitly selecting an image file used for the processing.

Figure 6:
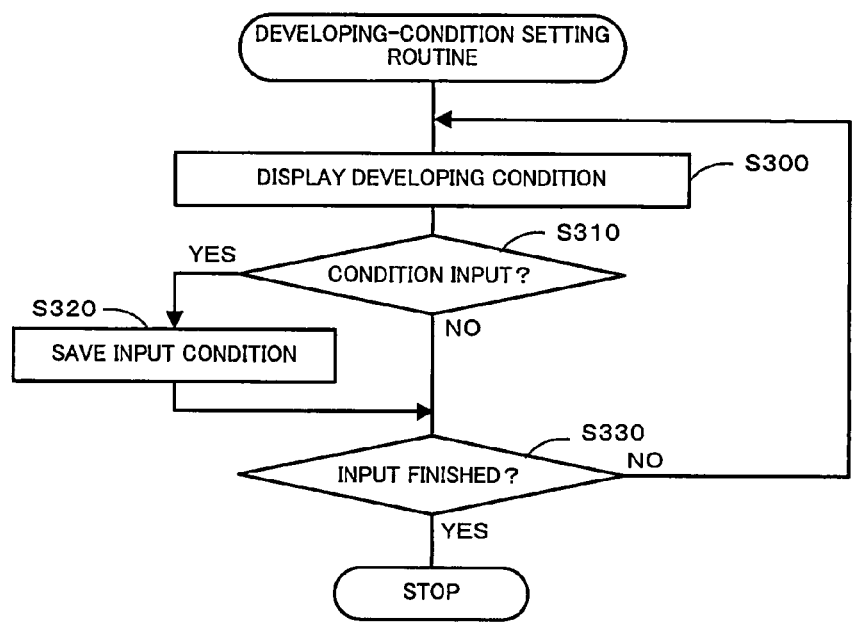
FIG. 6 is a flowchart showing an example of a developing-condition setting routine.

Now, "Print with image quality adjustment" will be described. In the digital camera 20 in the second embodiment, the user is allowed to input, by operations of the operation unit 34, developing conditions such as a method of pixel interpolation between imaging elements, a white balancing condition, or a gamma correction condition, so that a JPEG file can be generated from a RAW file according to the developing conditions input by the user. Thus, features of a RAW file before development, used to generate a JPEG file, can be utilized sufficiently. FIG. 6 is a flowchart showing an example of a developing-condition setting routine. This routine is stored in the ROM 44, and is executed by the CPU 42 when "Setting of developing conditions" is selected in a menu screen (not shown) and then the enter key 34c is pressed. Upon the start of the routine, the CPU 42 displays a developing-condition setting screen (not shown) on the display 32, the developing-condition setting screen allowing input of values of developing conditions for image development (step S300). The developing conditions include, for example, conditions for optical black processing for reducing a black signal level to zero by subtracting a value of an optical black level, white balancing for correcting variation in color due to a light source used for imaging, pixel interpolation for interpolating color information between pixels, resizing for changing the size of an image, color reproduction for adjusting the color balance of a captured image, sharpening for enhancing edges of an image, and gamma correction for adjusting image contrast and correcting tones appropriately in accordance with the characteristics of an output destination of the image. Then, the CPU 42 checks whether a value has been input by a key operation (step S310). If a value has been input, the CPU 42 saves the value in the flash memory 26a (step S320). After step S320, or if no developing condition has been input in step S310, the CPU 42 checks whether the input operation has been finished on the basis of whether an input completion button (not shown) has been selected (step S330). If the input operation has not been finished, the CPU 42 executes step S300 and the subsequent steps. If the input operation has been finished, the CPU 42 exits the routine. As described above, the user is allowed to set parameters for developing a RAW file into a JPEG file. When the user sets the parameters, an image generated on the basis of the parameters input by the user may be displayed on the display 32. This allows the user to check how changes in the values of the parameters are reflected on the image.

With the digital camera 20 according to the second embodiment described above in detail, the user can readily determine which of a RAW file and a JPEG file should undergo predefined processing by checking an image of the RAW file and an image of the JPEG file, and the user can readily select a desired file. Furthermore, text representing options of predefined processing is displayed on the display 32, each of the options being defined so that either a RAW file or a JPEG file is selected upon selection of the option, predefined processing is executed on the RAW file or the JPEG file simply by selecting an option of processing. Thus, user can readily select a desired file with a reduced load of operation. Furthermore, since the user can set developing conditions so that development can be executed according to the developing conditions, RAW files can be used more effectively. Thus, the user can obtain an image having a more suitable image quality (image tone) by checking the image quality on the display 32.

The present invention is not limited in any way to the embodiments described above, and various modifications and alternatives can be conceived within the technical scope of the present invention.

For example, in the first embodiment, an image file is selected after selecting deletion as predefined processing. Alternatively, predefined processing may be selected from a processing menu that is displayed after an image file is selected in the selection menu 82 (refer to FIG. 4). For example, the processing menu includes one or more options of predefined processing suitable for the selected image file, such as deletion, copying, moving, printing, and developing, with the options arrayed vertically. This allows the user to select individual image files belonging to an image file group including two or more image files, and the user can readily select a desired file.

Figure 7:
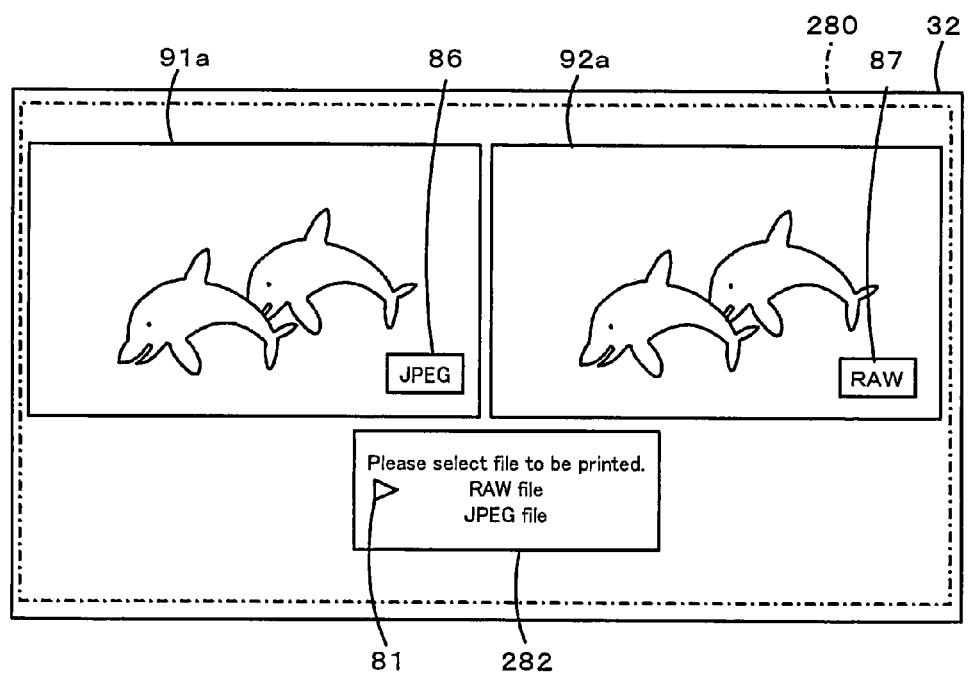
FIG. 7 is an illustration of yet another image selection screen.

In the second embodiment, after an image is selected, the image selection screen 180 including six thumbnail images and in which the image 80a and the image 90a are arranged side by side is displayed on the display 32. Alternatively, after the image 80 is selected, an image selection screen 280 in which a JPEG file (an image 91a) and a RAW file (an image 92a) are arranged side by side in the entire screen of the display 32 may be displayed on the display 32 as a screennail, as shown in FIG. 7. FIG. 7 is an illustration of the image selection screen 280. In the image selection screen 280, a JPEG display area showing "JPEG" is provided in the image 91a, and a RAW display area 87 showing "RAW" is provided in the image 92a. This allows the user to readily check difference in image quality or the like. Although a selection menu 282 that allows the user to select an image used for printing is displayed in FIG. 7, alternatively, for example, the selection menu 82 (FIG. 4) or the selection menu 182 (FIG. 5) may be displayed.

Figure 8:
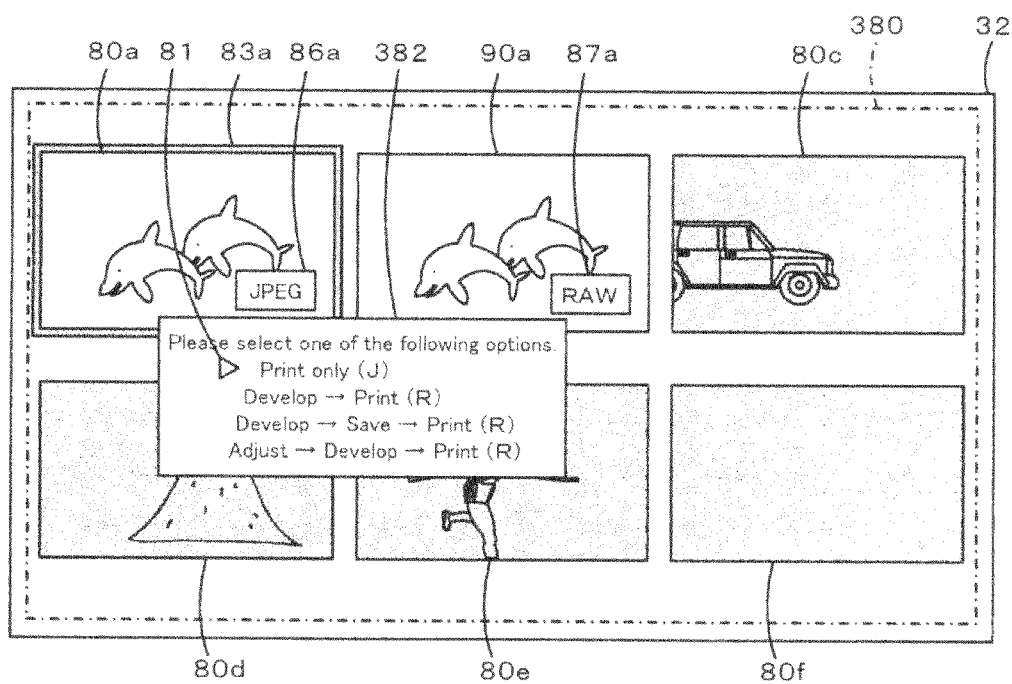
FIG. 8 is an illustration of still another image selection screen.

In the second embodiment, the selection menu 182 (refer to FIG. 5) showing options of processing in simple forms is displayed on the display 32. Alternatively, a selection menu 382 showing specific processing, such as "Print only (J)", "Develop→Print (R)", "Develop→Save→Print (R)", and "Adjust→Develop→Print (R)", may be displayed on the display 32, as shown in FIG. 8. FIG. 8 is an illustration of the image selection screen 382. Also in this case, predefined processing is executed on either a RAW file or a JPEG file simply by processing an option of processing, and the user can readily select a desired file with a reduced load of operation.

In the embodiment described above, when an image of an image file group is selected, the selection menu 182 including options of processing for a JPEG file and a RAW file is displayed on the display 32. When a single image file is selected, for example, only options of processing applicable to the selected image file are displayed. Alternatively, invalid options of processing may be blacked out to prohibit selection. This also applies to the selection menu 382.

In the embodiments described above, for deletion or printing of an image file, an image corresponding to one of the image files belonging to an image file group is displayed on the display 32 in such a manner that the user is allowed to select the image, and the selection menu 82 showing text that allows the user to select an image file to be deleted among the image files belonging to the image file group is displayed on the display 32. That is, only an image corresponding to one image file among the image files belonging to the image file group is displayed, and text that allows the user to select one of the image files is displayed. Also for copying or moving of an image file or developing of a RAW file, it is possible to display only an image corresponding to one image file among the image files belonging to the image file group and to display text that allows the user to select one of the image files. Also in this case, advantages similar to the advantages of the embodiments can be achieved.

In the embodiments described above, only an image corresponding to one image file among the image files belonging to the image file group is displayed and text that allows the user to select one of the image files is displayed in response to an instruction for starting selection of an image file that is to be deleted or printed according to a user's operation of the operation unit 34. However, the present invention is not limited to the embodiments. For example, it is possible to display only an image corresponding to one image file among the image files belonging to the image file group and to display text that allows the user to select one of the image files when the amount of information of image files stored in the RAM 46, which temporarily stores information of image files stored in the flash memory unit 26, has exceeded a predetermined permissible amount of storage (e.g., 80% of the capacity). Yet alternatively, it is possible to display only an image corresponding to one image file among the image files belonging to the image file group and to display text that allows the user to select one of the image files when the amount of information stored in the flash memory unit 26 has exceeded a predetermined permissible amount of storage (e.g., 80% of the capacity). This also allows the user to select individual files belonging to an image file group including two or more image files, and the user can readily select a desired file. Furthermore, since the amount of information stored in the RAM 46 or the flash memory unit 26 can be saved, processing for display or deletion can be executed smoothly. Alternatively, it is possible to display only an image corresponding to one image file among the image files belonging to the image file group and to display text that allows the user to select one of the image files when the number of images that are to be displayed on the display 32 exceeds a predetermined permissible number. The "predetermined permissible number" refers to, for example, a maximum number of images that can be displayed in one page on the display 32. This inhibits the number of images from exceeding the permissible number. That is, this inhibits image display from spanning two or more pages, and the number of images displayed is reduced. Thus, the user can select a desired file efficiently.

Although the embodiments have been described above in the context of the digital camera 20, without limitation, the present invention can also be applied to other devices that display an image file belonging to an image file group. For example, the present invention can be applied to a picture viewer, a digital video, or a camera-equipped cellular phone that is capable of reproducing images, or a printing apparatus having a display, such as a printer or a facsimile machine. Although the description has been given using RAW files and JPEG files as image files, other image files may be used, such as BMP files or TIFF files. Furthermore, although the selection menu 82 displays options in text, alternatively, options may be displayed using symbols or graphics. Furthermore, although the present invention is embodied in the form of the digital camera 20 in the embodiments, the present invention may be embodied in the form of an image display method or a program of the image display method.

The present application claims priority from Japanese Patent Application No. 2006-264473 filed on Sep. 28, 2006 and Japanese Patent Application No. 2007-185815 filed on Jul. 17, 2007, the entire contents of both of which are incorporated herein by reference.

What is claimed is:

1. An image display controlling device comprising:
a display unit capable of displaying an image;
an acquisition module that acquires an image file from a storage module;
a determination module that determines whether the acquired image file belongs to an image file group including two or more image files, each of the two or more image files being an original image file or a generated image file generated from the original image file; and
a control module that
displays on the display unit an image corresponding to one of the image files belonging to the image file group when it is determined by the determination module that the acquired image file belongs to the image file group, in such a manner that a user is allowed to select the image,
when the user selects the image corresponding to one of the image files belonging to the image file group, displays on the display unit a first menu that allows the user to select an original image file of the selected image, a generated image file of the selected image, or both the original and generated image files of the selected image on which predefined processing indicated in the first menu is to be executed among the image files belonging to the image file group, and when the user selects the original image file, the generated image file, or both the original and generated image files, executes the predefined processing on the selected original image file, the selected generated image file, or both the selected original and generated image files, the first menu including text, graphics, or symbols, and when the user selects an image of a single image file not belonging to any image file group, displays a second menu that allows the user to select execution of the predefined processing on the single image file, and when the user selects execution of the predefined processing on the single image file, executes the predefined processing on the single image file, the second menu being different from the first menu;

wherein, after displaying on the display unit an image corresponding to one of the image files belonging to the image file group in such a manner that the user is allowed to select the image, when an image of the image file group has been selected and the information has been displayed, the information being represented by text, graphics, or symbols, and allowing the user to select an image file on which predefined processing is to be executed among the image files belonging to the image file group, the control module displays on the display unit an image of the original image file and an image of the generated image file in such a manner that the user is allowed to compare these images; and wherein the displayed first menu is specifically tailored to the selected image corresponding to one of the image files belonging to the image file group and is not displayed if the user selects the image of the single image file, and the displayed second menu is specifically tailored to the single image file and is not displayed if the user selects the image corresponding to one of the image files belonging to the image file group.

2. The image display controlling device according to claim 1, wherein the determination module determines whether the acquired image file belongs to an image file group including a RAW file and a JPEG file, the RAW file being a pre-development, uncompressed or lossless-compressed file that serves as the original image file, and the JPEG file being a post-development lossy-compressed file that serves as the generated image file.

3. The image display controlling device according to claim 1, wherein, in displaying information that allows the user to select an image file on which predefined processing is to be executed among the image files belonging to the image file group, the information being represented by text, graphics, or symbols, the control module displays on the display unit text, graphics, or symbols representing the predefined processing defined so that either the original image file or the generated image file is selected upon selection of the predefined processing.

4. The image display controlling device according to claim 1, further comprising a selection module that allows the user to select an image displayed on the display unit, wherein the control module displays on the display unit an image of an image file determined by the determination module as belonging to the image file group and an image of a single image file determined by the determination module as not belonging to the image file group, in such a manner that the user is allowed to select either one of these images, and the control module displays on the display unit information that allows the user to select an image file on which predefined processing is to be executed among the image files belonging to the image file group when the image of the image file belonging to the image file group has been selected by the selection module, the information being represented by text, graphics, or symbols.

5. The image display controlling device according to claim 1, further comprising an instruction acquisition module that acquires from the user an instruction for starting selection of an image file on which the predefined processing is to be executed, wherein the determination module checks whether the image file stored in the storage module belongs to the image file group after the instruction acquisition module has obtained the instruction for starting selection of an image file.

6. The image display controlling device according to claim 1, further comprising:

a condition input module that allows input of a condition used to generate a generated image file from the original image file according to an operation by the user; and a generation execution module that generates the generated image file from the original image file according to the condition input;

wherein the control module causes the generation execution module to generate the generated image file from the original image file according to the condition input when generation of a generated image file is selected as the predefined processing.

7. The image display controlling device according to claim 1, wherein the control module displays information that allows the user to select one of deletion of an image file, copying of an image file, moving of an image file, and printing of an image file, and generation of a generated image file as the predefined processing.

8. An imaging device comprising:

an imaging module capable of capturing an image of an object;

an image-file creating module that creates an image file from information of the image captured by the imaging module and that stores the image file in a storage module; and the image display controlling device according to claim 1.

9. The image display controlling device according to claim 1, wherein the control module displays on the display unit an image corresponding to one of the image files belonging to the image file group when the number of images displayed on the display unit exceeds a predetermined permissible number, in such a manner that the user is allowed to select the image, and displays on the display unit information that allows the user to select an image file on which predefined processing is to be executed among the image files belonging to the image file group, the information being represented by text, graphics, or symbols.

10. The image display controlling device according to claim 1, wherein the control module includes a buffer module that temporarily stores information of the image file stored in the storage module, and the control module displays on the display unit an image corresponding to one of the image files belonging to the image file group when the amount of information stored in the buffer module exceeds a predetermined permissible storage amount, in such a manner that the user is allowed to select the image, and displays on the display unit information that allows the user to select an image file on which predefined processing is to be executed among the image files belonging to the image file group, the information being represented by text, graphics, or symbols.

11. An image display method using a display unit capable of displaying an image and a storage module capable of storing an image file, comprising the steps of:
- (a) determining whether the image file stored in the storage module belongs to an image file group including two or more image files, each of the two or more image files being an original image file or a generated image file generated from the original image file; and
- (b) displaying on the display unit an image corresponding to one of the image files belonging to the image file group when it is determined by the step (a) that the stored image file belongs to the image file group, in such a manner that a user is allowed to select the image, when the user selects the image corresponding to one of the image files belonging to the image file group, displaying on the display unit a first menu that allows the user to select an original image file of the selected image, a generated image file of the selected image, or both the original and generated image files of the selected image on which predefined processing indicated in the first menu is to be executed among the image files belonging to the image file group, and when the user selects the original image file, the generated image file, or both the original and generated image files, executing the predefined processing on the selected original image file, the selected generated image file, or both the selected original and generated image files, the first menu including text, graphics, or symbols, and when the user selects an image of a single image file not belonging to any image file group, displaying a second menu that allows the user to select execution of the predefined processing on the single image file, and when the user selects execution of the predefined processing on the single image file, executing the predefined processing on the single image file, the second menu being different from the first menu; and

- (c) after displaying on the display unit an image corresponding to one of the image files belong to the image file group in such a manner that the user is allowed to select the image, when an image of the image file group has been selected and the information has been displayed, the information being represented by text, graphics, or symbols, and allowing the user to select an image file on which predefined processing is to be executed among the image files belonging to the image file group, displaying on the display unit an image of the original image file and an image of the generated image file in such a manner that the user is allowed to compare these images; and wherein the displayed first menu is specifically tailored to the selected image corresponding to one of the image files belonging to the image file group and is not displayed if the user selects the image of the single image file, and the displayed second menu is specifically tailored to the single image file and is not displayed if the user selects the image corresponding to one of the image files belonging to the image file group.

12. The image display controlling device according to claim 1, wherein the information comprises a dialog including text, graphics, or symbols.

13. The image display controlling device according to claim 1, wherein the control module, in response to selection of the image file by the user, starts displaying information on which predefined processing is to be executed among the image files belonging to the image file group.

14. The image display method according to claim 11, wherein the information comprises a dialog including text, graphics, or symbols.

15. The image display method according to claim 11, further comprising, in response to selection of the image file by the user, start displaying information on which predefined processing is to be executed among the image files belonging to the image file group.

* * * * *